April 10, 1928.

J. H. VALLEAU 1,665,646

VEHICLE SUPPORT

Filed Aug. 30, 1926

Inventor

J. H. Valleau

By Lacey & Lacey, Attorneys

April 10, 1928.  
J. H. VALLEAU  
VEHICLE SUPPORT  
Filed Aug. 30, 1926
1,665,646
2 Sheets-Sheet 2
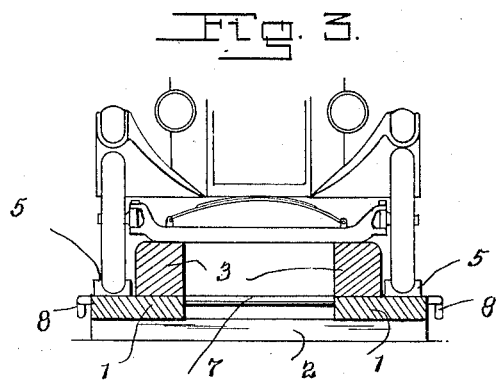
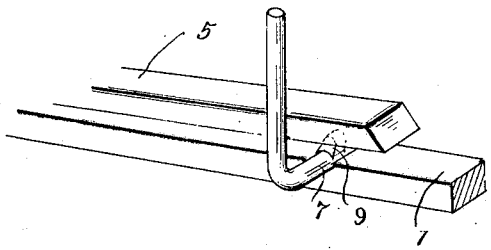
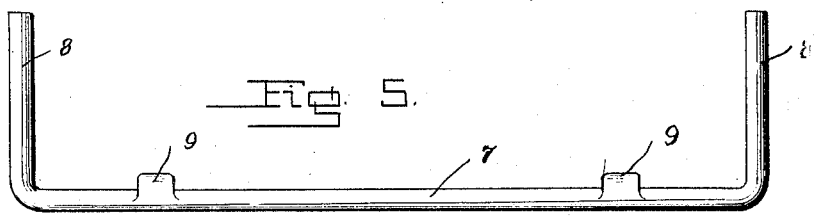
Inventor  
J. H. Valleau  
By Lacey & Lacey, Attorneys Patented Apr. 10, 1928.

1,665,646

UNITED STATES PATENT OFFICE.

JAMES H. VALLEAU, OF RENO, NEVADA.

VEHICLE SUPPORT.

Application filed August 30, 1926. Serial No. 132,566.

This invention relates to vehicle supports and one object of the invention is to provide a device which may be disposed upon the floor of a garage and support an automobile housed therein with its tires out of contact with the floor. By supporting an automobile with its wheels elevated slightly above the floor weight will be removed from the tires and their life extended.

Another object of the invention is to so construct the support that an automobile may be readily driven onto or off of the same and the use of a jack eliminated Another object of the invention is to prevent the wheels of the automobile from slipping transversely of the support while being driven onto or off of it.

The invention is illustrated in the accompanying drawing, wherein,—

Figure 3 is a transverse sectional view taken through the support along the line 3—3 of Figure 1.

Figure 4 is a fragmentary perspective view of a portion of the support, and

Figure 5 is an enlarged view of a rocker shaft forming an element of the support.

Figure 1:
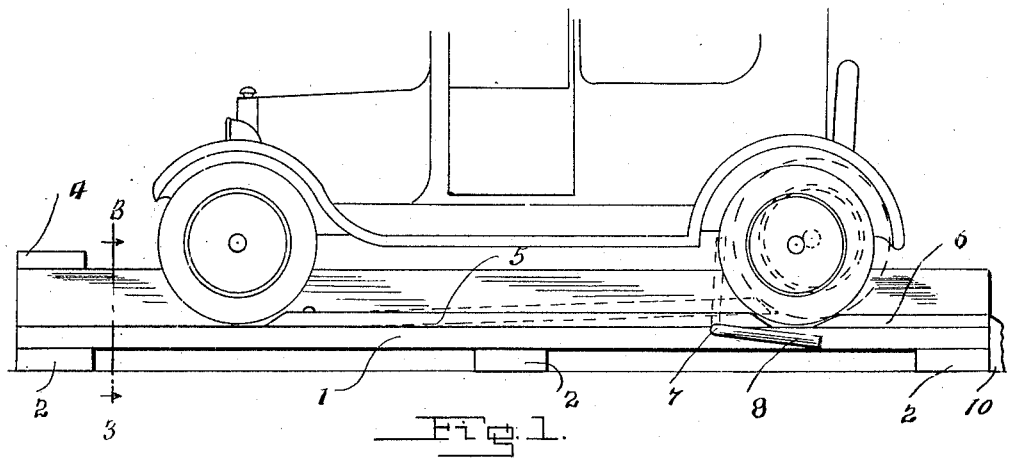
Figure 1 is a view in side elevation showing an automobile resting upon the improved support.
Figure 2:
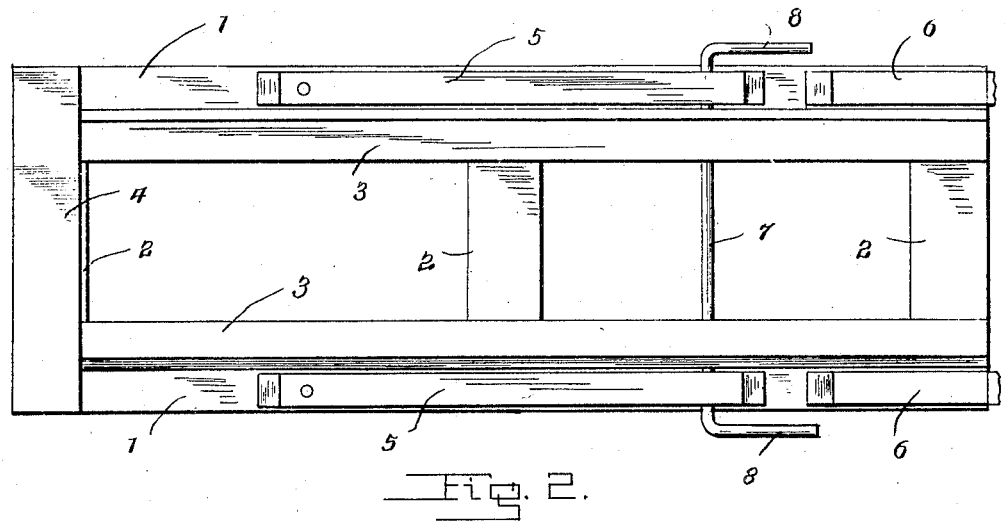
Figure 2 is a top plan view of the support.

The support constituting the subject matter of this invention consists of a frame having side strips 1. The side strips are preferably planks of sufficient thickness to prevent them from being bowed downwardly by the weight of the automobile and these side strips are firmly nailed or otherwise secured upon cross strips 2 which may be referred to as ties. Beams 3 extend longitudinally upon the side strips 1 and are suitably secured thereon. The beams are spaced from the outer side edges of the strips and are intended to engage the front and rear axles of the automobile between the wheels thereof, as shown in Figure 3, and also serve to prevent the automobile from moving transversely upon the frame a sufficient distance to permit the wheels to slip off of the same. At their forward ends the beams carry a cross strip 4 which serves to brace them and also constitute a bumper adapted to engage the front axle of an automobile and prevent the automobile moving forwardly off of the frames. Front and rear track strips 5 and 6 extend longitudinally upon the side strips. These track strips have their adjacent ends spaced from each other and at their ends are beveled so that the wheels of the automobile may readily move onto and off of them. The rear track strips are firmly secured so that they do not have movement upon the side strips but the front track strips are only secured at their forward ends, and have their rear ends free so that they may be forced upwardly, as shown in Figure 4. The track strips may be of any material desired but metal is preferably used and the front track strips are resilient so that while they will normally rest upon the side strips as shown in Figure 2, they may be forced upwardly to the position shown in Figure 4, and indicated by dotted lines in Figure 1. While it has been stated that the strips and beams forming the frame are preferably wood it will be understood that metal or other suitable materials may be employed. A rocker shaft 7 extends transversely across the frame and at its ends is provided with bent portions forming handles or levers 8, by means of which it may be rotated to swing its cams 9 upwardly and elevate the rear end portions of the front track strips.

When erected the frame may be embedded in the floor of a garage a sufficient distance to permit the automobile to be readily driven onto or off of the track strips or gangways 10 may be provided at its rear end. When an automobile is driven onto the support the front wheels first move over the rear track strips and then onto the front track strips. The rear wheels which are the driving wheels move along the rear track strips until they pass off of their forward ends. The front wheels will move off of the forward ends of the front track strips at the same time that the rear wheels move off of the rear track strips and when this happens the axles of the chassis will rest upon the side beams 3 and support the automobile with the wheels elevated and their tires out of engagement with the side strips 1. The tires will therefore be relieved from weight and will not be liable to crack or have flat portions form if the automobile remains in the garage for some time. When it is desired to use the automobile, the rocker shaft is grasped by one of its handles and rotated to swing its cam upwardly and elevate the rear end portion of the front track strips.

When the front track strips are swung upwardly their rear ends will be brought into contact with the tread portions of the rear tires so that the rear wheels may have engagement with them to impart rearward movement to the automobile. It will thus be seen that under ordinary circumstances the motor may be left running while the automobile is supported upon the device without moving forwardly or rearwardly beyond the position shown in Figure 1, but it may be moved off of the support very easily when desired.

Having thus described the invention, I claim:

1. A vehicle support comprising supporting means adapted to engage the chassis of a vehicle and support the vehicle with its wheels elevated, front and rear track members spaced from each other and along which the wheels of a vehicle travel when the vehicle is moving onto and off of the support, the front track members being of a length to be disposed between the front and rear wheels of a vehicle resting upon said supporting means, and means to move the front track members into position to engage the tread portions of tires of the rear wheels of a supported vehicle and permit movement of the vehicle rearwardly off of the support.

2. A vehicle support comprising supporting means adapted to engage the chassis of a vehicle and support the vehicle with its wheels elevated, front and rear track members spaced from each other and along which the wheels of a vehicle travel when the vehicle is moving onto and off of the support, the front track members being of a length to be disposed between the front and rear wheels of a vehicle resting upon said supporting means and being formed of strips of resilient material and having free rear end portions, a rocker bar extending transversely of the support, and cams carried by said shaft and adapted to move the rear end portions of the front track members upwardly into position to engage the tread portions of tires of the rear wheels of a supported vehicle and permit movement of the vehicle rearwardly off of the support.

3. A vehicle support comprising elongated members adapted to extend longitudinally beneath a vehicle and support the chassis of the vehicle with its wheels elevated, front and rear track members spaced from each other and disposed adjacent said elongated members and adapted to be engaged by the wheels of a vehicle moving onto and off of said support, the front track members being disposed between the front and rear wheels of a vehicle when the chassis thereof is resting upon the elongated members and means for moving the front track members into position to engage tread portions of the rear wheels of a vehicle resting upon the support and permit movement of the vehicle off of the support.

4. A vehicle support comprising elongated members adapted to extend longitudinally beneath a vehicle and support the chassis of the vehicle with its wheels elevated, front and rear track members spaced from each other and disposed adjacent said elongated members and adapted to be engaged by the wheels of a vehicle moving onto and off of said support, the front track members being disposed between the front and rear wheels of a vehicle when the chassis thereof is resting upon the elongated members, and having free rear end portions, and means to move the rear end portions of said front track members upwardly into position to engage tread portions of tires carried by the rear wheels of the vehicle and permit movement of the vehicle rearwardly off of the support.

5. A vehicle support comprising elongated members adapted to extend longitudinally beneath a vehicle and support the chassis of the vehicle with its wheels elevated, front and rear track members spaced from each other and disposed adjacent said elongated members and adapted to be engaged by the wheels of a vehicle moving onto and off of said support, the front track members being disposed between the front and rear wheels of a vehicle when the chassis thereof is resting upon the elongated members, and being formed of resilient material and having free rear end portions, and means to move the rear end portions of the front track members upwardly into engagement with the tread portions of tires of the rear wheels of a vehicle resting upon said elongated members and permit rearward movement of the vehicle off of the support.

6. A vehicle support comprising elongated members spaced transversely from each other and adapted to extend longitudinally beneath a vehicle, forward and rear track members extending longitudinally of said elongated members adjacent their outer sides, said forward and rear track members having their adjacent ends spaced from each other and the forward track members being of a length to be disposed between the front and rear wheels of a vehicle when its rear wheels are between the forward and rear track members, the elongated members being of a height to engage the axles of a vehicle when the forward track member is between its front and rear wheels and support the vehicle with its wheels elevated and means for moving the rear portions of said forward track members upwardly into position to engage tread portions of the rear wheels of a vehicle resting upon the elongated members and permit movement of the vehicle off of the support.

7. A vehicle support comprising a base including longitudinally extending side strips, bars extending longitudinally upon said strips in spaced relation to their outer side edges and projecting upwardly therefrom and adapted to engage beneath the chassis of a vehicle and support the vehicle with its wheels elevated out of engagement with the said side strips, front and rear track strips extending longitudinally of said side strips between their outer side edges and said supporting bars along which the wheels of a vehicle travel when moving onto and off of the support, the front track strips being spaced from the rear track strips and of a length to be disposed between the front and rear wheels of a vehicle resting upon the support, and means to move the front track strips into position to engage the tread portions of tires of the rear wheels of a supported vehicle and permit movement of the vehicle rearwardly off of the support.

8. A vehicle support comprising a base including longitudinally extending side strips, bars extending longitudinally upon said strips in spaced relation to their outer side edges and projecting upwardly therefrom and adapted to engage beneath the chassis of a vehicle and support the vehicle with its wheels elevated out of engagement with said side strips, front and rear track strips extending longitudinally of said side strips between their outer side edges and said supporting bars and along which the wheels of a vehicle travel when moving onto and off of the support, the front track strips being spaced from the rear track strips and of a length to be disposed between the front and rear wheels of a vehicle resting upon the supports, said front track strips being resilient and having free rear end portions, a rocker shaft extending transversely across said side strips beneath the rear end portions of said front track strips and formed with cams engaging the under faces of the front strips and means to rotate said shaft and swing its cams upwardly to move the rear end portions of the front track strips upwardly into position to engage the tread portions of tires of the rear wheels of a supported vehicle and permit movement of the vehicle rearwardly off of the support.

In testimony whereof I affix my signature.

JAMES H. VALLEAU. [L. S.]